INVENTOR
Gerald L. Coen
BY W. B. Harpman
ATTORNEY

INVENTOR
Gerald L. Coen
BY W. B. Harpman
ATTORNEY 2,811,585

REMOTE CONTROL SYSTEM FOR RECORDING-REPRODUCING MACHINES

Gerald L. Coen, Akron, Ohio

Application May 19, 1953, Serial No. 356,072

8 Claims. (Cl. 179—6)

Figure 1:
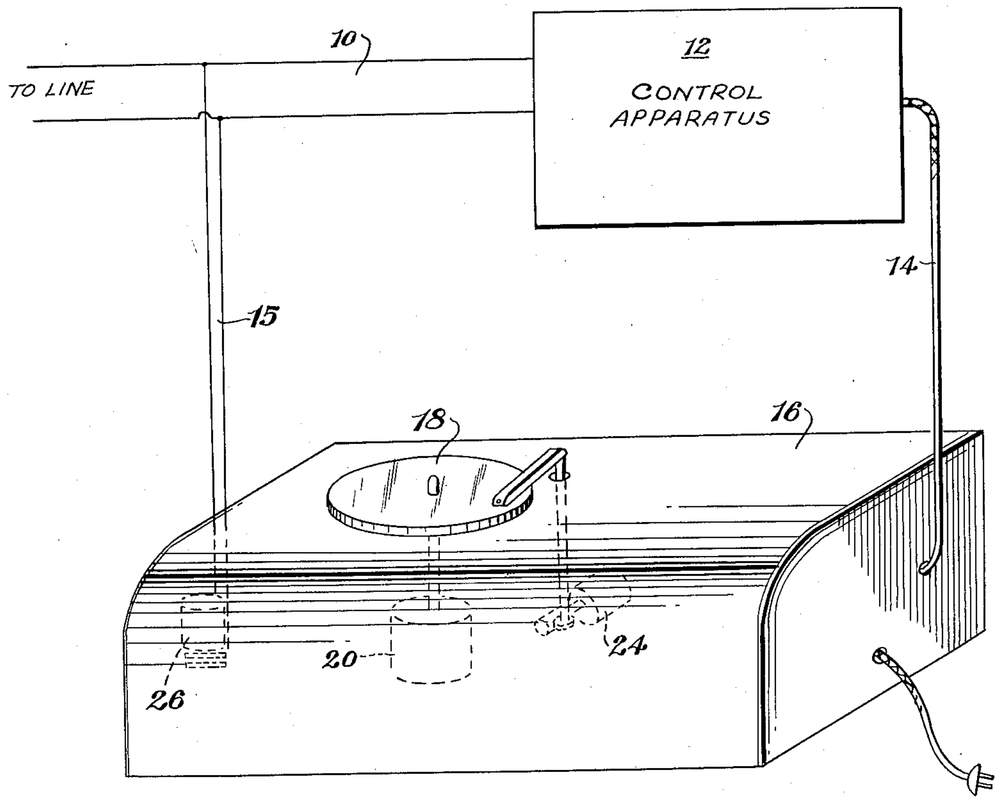

This invention pertains to sound recorders, and particularly to a system for connecting a sound recorder and reproducer, or a dictating machine, to commercial telephone lines, whereby the facilities of a dictating machine can be made available to a person who is away from his office or from the location where the recorder is placed.

Equipment of this type has various applications. Thus, a businessman whose office is equipped with a recorder or dictating machine may wish to dictate letters, instructions or the like when he is away from his office and the office is unattended, and he may also wish to be able to receive messages previously recorded thereon by his office staff or others. A further field of application lies in the provision of a limited number of centrally located recorders or dictating machines, which can be made available over telephone lines to a much larger number of members of an organization, who may be scattered over a building. In such a system, the expense of providing special interconnecting conductors is prohibitive, and it is desirable to be able to operate the system over existing commercial telephone circuits.

Previous proposals for the solution of the problem have had several objections. Where control of the various functions of the recorder has been attempted by means of special control syllables, the design of the equipment is extremely complicated, and is rendered unreliable because of differences in voices. Proposals have been made in which the function control is achieved by a direct D. C. path from a remote telephone dial, but such arrangements interfere wtih the normal operation of the telephone system, and in any event can only be used with certain types of subscriber equipment.

It is accordingly a principal object of this invention to provide apparatus which can be connected between any existing telephone line and nearly any type of commercial recorder-reproducer or dictating machine, and which will permit control of said machine over commercial telephone lines in a reliable manner, and which will not interfere with the normal operation of the telephone system.

A further object of the invention is to provide apparatus of the above type in which the control of the various functions of the recording machine is accomplished in response to operation of the dial at the point where the remote control is being exercised, but in which a direct path in series with the telephone loop is not required. In general, this object of this invention is accomplished by utilizing the audio frequency energy associated with the dial pulses as transmitted over the telephone line, provision being made to prevent undesired operation of the controlling circuits by energy of voice frequency and the normal amplitudes employed in speech.

Figure 2:
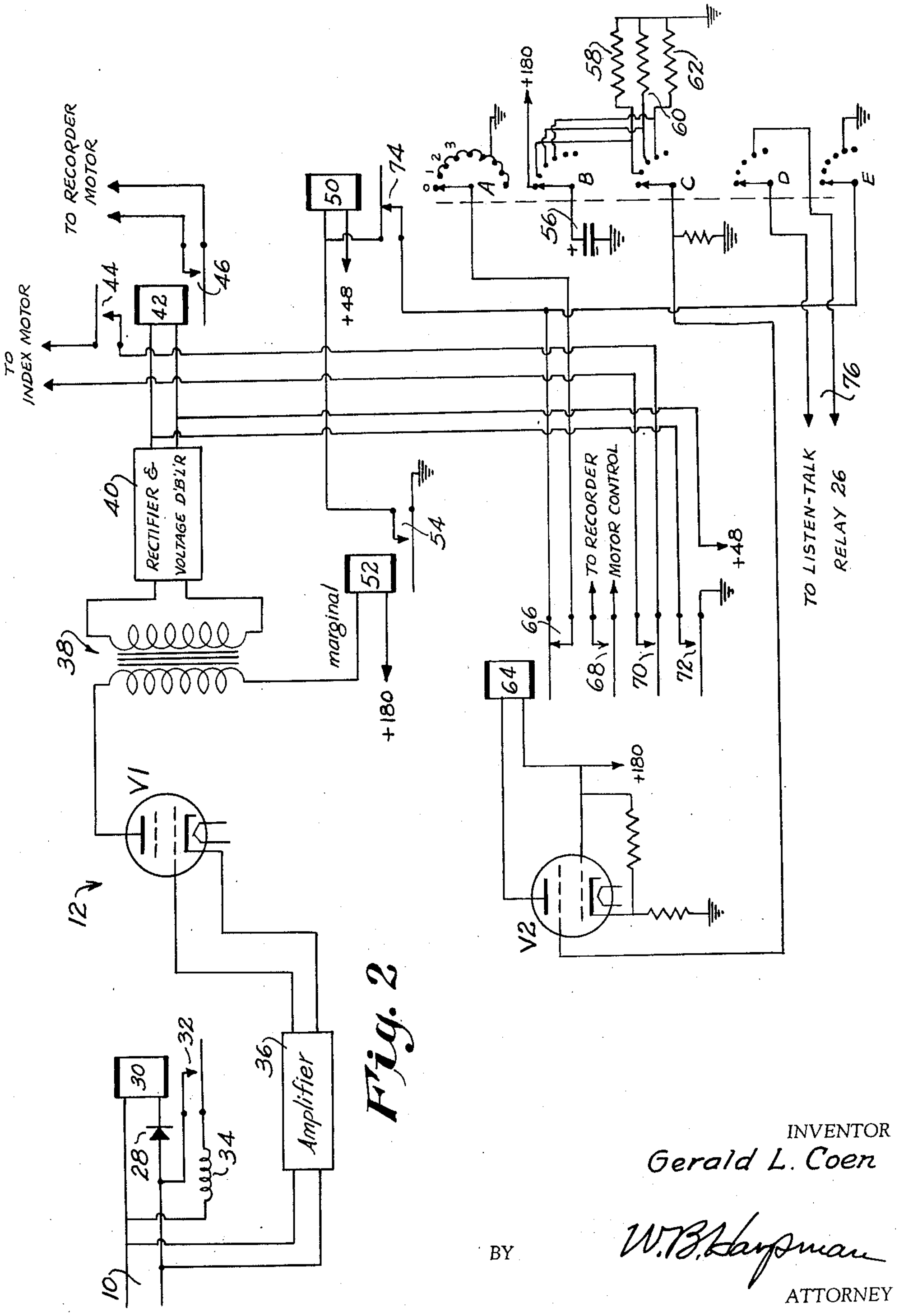

The above and other objects and advantages of the invention will best be understood by referring to the following detailed specification of a preferred embodiment thereof, taken in connection with the appended drawings, in which:

Fig. 1 is a schematic view illustrating the apparatus in accordance with the invention connected between a telephone line and a conventional form of dictating machine which combines recording and play-back facilities, and Fig. 2 is a schematic wiring diagram of the apparatus of the invention itself, indicating the way in which it operates and the control connections to the conventional recording machine.

Referring now to Fig. 1 of the drawings, there are indicated at 10 the conductors corresponding to a conventional telephone subscriber circuit, it being understood that this pair of conductors can therefore be reached from any telephone in the service area. Numeral 12 designates generally the apparatus of the present invention, the same being connected to the telephone line 10 and in turn as by cabling 14 with a dictating machine which may be of any known or desired type so long as it is provided with motor control, listen-talk control and provision for playback of previously recorded signals or speech. Power for the recorder is obtained from the commercial electric line, and the voltages required for equipment 12 may be obtained from the power circuits of the recorder or from any convenient source.

It will be understood that when a call is made to this line, it is necessary for the equipment to simulate the same actions, so far as concerns the holding of the connection to the central office, as occur when a telephone is answered. Telephone systems differ in their details of this arrangement, some employing an increase in current through the line when the receiver is lifted in answering, others employing reversal of the line polarity at this time. The present invention is adaptable to either type, or even to other kinds of arrangements, by suitable holding provisions, but it will be described in what follows in connection with a system of the type employing polarity reversal when the called line "answers."

As here shown, the recording machine 16 is of the disc type, having a turntable 18 driven by a motor 20, a record-reproduce element such as a pickup arm 22 whose position with respect to the record on the turntable may be controlled by an index motor, solenoid or the like designated generally by numeral 24. In addition, such unit will normally include a suitable amplifier, not shown, and a relay such as 26 which can be controlled over cable 14 so as to connect the amplifier for either recording or reproducing functions. Speech signals to be recorded are obtained from line 10 by any usual means, either direct high-impedance connection or by an inductive pick-up, and conveyed to the recorder as by conductors 15. When relay 26 is energized, it operates in a known manner to re-connect the amplifier of the recorder so as to reproduce, over the same conductors 16, signals previously recorded by the device.

Various designs and makes of dictating machines embodying these features are available, and inasmuch as the present invention is concerned with the controlling of such equipment, rather than its detailed design, it is not believed necessary to illustrate exemplary arrangements of the recorder itself in any further detail.

The manner in which the apparatus of the present invention cooperates with the control circuits of the recorder will best be understood by referring now to Fig. 2 of the drawings. In this figure, the incoming telephone line is again indicated by numeral 10. It enters the control apparatus (again designated as a whole by numeral 12) and is connected through a rectifier 28 to a relay 30 whose contacts 32, in series with a relay coil 34, are also connected across line 10. The rectifier 28 is a half-wave rectifier, preferably of the dry type, and is poled so as normally to prevent the flow of direct current from the talking battery at the telephone exchange through relay 30.

When a call is made to this line from an outside telephone, the usual alternating current ringing voltage will be supplied to line 10, and half-waves of this will pass rectifier 28 and energize relay 30 to close its contacts 32. This connects across the line 10 a relay coil 34 whose value is sufficient to reverse the polarity of the telephone line. Rectifier 28 thereupon conducts, holding relay 30 in operated condition until the remote station hangs up. This again reverses the line polarity so that rectifier 28 ceases to conduct, and relay 30 is de-energized, opening contacts 32 so that the apparatus is ready to receive another call.

As a call comes in, the audio signals (speech) present on the line 10 are amplified by an amplifier 36 whose output is connected between the cathode and control grid of vacuum tube V1. The signal impressed on the control grid is applied through a relay to be described, to the primary winding of a transformer 38, whose secondary winding feeds the combined rectifier and voltage doubler 40. Since the construction of this latter unit is well known to those skilled in the art, it, like the conventional amplifier 36, is indicated in block form. The output of voltage doubler 40 is applied to relay 42, closing contacts 44 and 46. As indicated, contacts 46 are connected to the control circuit for the recorder motor 20 (Fig. 1) so that the recorder will operate to record impulses received over line 10 by conductors 15, which are now connected by listen-talk relay 26 to the input of the recording apparatus. Thus, any speech coming in over line 10 will be recorded.

In order to provide for control, over the telephone line, of the various desired functions of the recorder, the apparatus is arranged so as to be capable of sensing the particular audio frequency impulses produced on the telephone line when the dial at the remote control station is operated one or more times. By way of example, the equipment is here illustrated as responding to the dialing of the respective digits 1, 2 and 3, which produce those respective numbers of relatively high amplitude noise pulses on the telephone line. To discriminate between the control digits which have been dialed, a rotary selector switch having a stepping magnet 50 is provided, controlled by a relay 52 whose coil is connected between a local source of direct current voltage (indicated by +180) which feeds the primary of transformer 38 and the plate circuit of tube V1. Relay 52 is so designed that while it will not operate in response to speech signals produced in the output of tube V1, it will respond and operate once each time that the tube V1 is energized by the relatively high-amplitude signal pulse corresponding to the operation of the dial at the controlling station. In other words, 52 is a marginal relay sensitive to dial pulses but insensitive to speech energy.

When a single dial pulse is received over the line, relay 52 operates and momentarily closes its contacts 54, which connect the 48 volt source to the stepping magnet 50 of the rotary selecting switch. Upon cessation of the pulse, the armature of magnet 50 drops under spring action and, in a well known manner, advances all of the wipers of contact levels A to E one step from their home positions. Referring to level A, all of whose contacts except the first (corresponding to the home position) are connected to ground, a homing circuit is prepared for use in a manner to be described below.

At level B of the selector switch, the wiper arm in its home position is connected between the 180 volt D. C. source and a storage condenser 56. Thus, when the wiper arm leaves home, the charged condenser 56 is connected to one or another of three resistors 58, 60 and 62, whose opposite ends are all grounded. The particular resistor connected depends upon the number of digits dialed. Condenser 56 will thus lose its charge through the selected resistor of these three at a rate depending upon the value of the selected resistor. The wiper of level C of the selector switch connects to the high-potential (positive) end of the selected resistor, and therefore applies (during discharge of 56) a positive potential to the control grid of vacuum tube V2, whose plate circuit includes the coil of a relay 64 and is again fed by the 180 volt source.

Thus, when the wipers of the selector switch are stepped once, to their first position away from home, tube V2 has a positive potential applied to its grid, and hence conducts and remains conducting for a period determined by the value of the first resistor 58, which may for example be 4700 ohms. Relay 64 will therefore be energized for a predetermined period, opening its contacts 66 and closing its contacts 68, 70 and 72. Contacts 66 are in series with the wiper arm of level A and self-interrupting contacts 74 of magnet 50, which contacts 74 are interrupted each time magnet 50 is energized. This self-interruption of contacts 74 will cause the wipers to advance repeatedly, but only when contacts 66 of relay 64 are closed, rotating the wipers until the homing circuit is opened by the return of the wiper of level A to its zero or home contact, which is ungrounded.

From the above, it will be seen that the application of the potential of condenser 56 to timing resistors 58, 60 or 62, and hence to tube V2 to operate relay 64 and open contacts 66, prevents the automatic homing of the selector switch until the charge on condenser 56 has leaked off through the selected timing resistor to such an extent that tube V2 no longer conducts. When this occurs, relay 64 is de-energized, contacts 66 are closed, and the selector switch (if not already on home position) is automatically stepped forward to its said position.

Returning now to the description of the device when a single dial pulse is received, the selector switch wipers are moved to their first off-normal position and relay 66 is hence operated for a predetermined period of time, during which the closure of its contacts 68 energizes the recorder motor control for this relatively short predetermined period. Also, contacts 70 are closed, and contacts 44 of relay 42 being also closed, the recorder and its index motor will operate. Contacts 44 of relay 42 are necessarily closed at this time, even though no speech signals are received by relay 42 from rectifier and doubler 40, because the winding of relay 42 is also connected by contacts 72 of relay 64 to the 48 volt source. Thus, whenever relay 64 operates to energize the recorder as a result of receipt of a dial pulse, the index motor will be energized to advance the recorder arm and therefore to insert a space in the recording. The length of the space will be determined by how long relay 64 remains energized, and in the case of a single dial pulse, this will be a rather short interval because of the low value of the discharge resistor 58.

At the end of the conducting period of tube V2, relay 64 will be de-energized, closing contacts 66 and causing the selector switch to advance to its home position. Recording of another message may now proceed. If the user desires to signify the end of a letter or communication, he will operate the dial to produce two dial impulses on the telephone line, which will operate relay 52 twice and cause magnet 50 to advance the wiper arms two steps away from their home positions. The homing circuit is again prepared, but since the wipers of levels B and C are now connected to resistor 60, tube V2 will conduct for a period determined by the value of resistor 60, which may be for example 150,000 ohms. Hence, the index motor and turntable motor on the recorder will run for a somewhat greater length of time, and this space will indicate the end of a letter or communication.

If three dial pulses are applied to the line 10, the wiper arms of the selector switch will advance to their third positions, and condenser 56 will discharge through resistor 62, which may have the value of 470,000 ohms. Relay 64 again operates, and the recorder and index motors are energized for (in the example being described) a considerably longer period of time. Also, the wiper of level D of the selector now completes a circuit 76 to the relay 26 (Fig. 1) of the recorder, which operates to put the recorder in reproducing or play-back condition, and the output signal from the recorder is fed back to the telephone line so that the remote operator can hear messages which have been recorded and which are to be delivered to him while his office is unattended.

It will be observed that the final level, level E of the selector switch, has its fifth contact (the fourth away from home position) grounded. In the event that the listener (having dialled the number "three" in order to put the apparatus in play-back condition) wishes to discontinue play-back immediately or at any time (as where there is no recorder message), he can do so by dialling one additional pulse. Wiper arm E will then complete the homing circuit immediately. In the event that a recorded message is too long for the time period provided by resistor 62, the user need only again dial the digit "three," whereupon a continuation of the play-back period will be provided, for a like period of time.

From the above, it will be seen that the apparatus of the present invention accomplishes the objects of the invention in a simple and efficient manner, and in particular permits the remote control of recording-reproducing equipment in a positive manner which is independent of the characteristics of the telephone system to which it is connected and of the characteristics of the voices of individual users. While the invention has been described in detail in connection with a preferred embodiment, it is obvious that changes and modifications can readily be made by those skilled in the art, without departing from the spirit of the invention. It is therefore intended that the invention is not to be restricted to the details shown, except as may be required by the scope of the appended claims.

What is claimed is:

1. Apparatus for the control of recording-reproducing equipment over dial system telephone lines, comprising an amplifier, relay means responsive to the completion of a telephone connection for connecting said amplifier to such a telephone line, relay means responsive to speech signals on said line for energizing a control circuit to activate a recorder connected to said apparatus, a multiposition selector switch, means including a relay responsive exclusively to the A. C. component of dial pulses received over said line for advancing said selector switch, and circuits controlled by said selector switch for controlling the recorder selectively for recording, spacing and play-back conditions.

2. Apparatus in accordance with claim 1, including means for restoring said selector switch to its home position upon completion of a call.

3. Apparatus in accordance with claim 1, including timing circuits controlled by said selector switch for energizing said recording-reproducing equipment for preselected intervals of time.

4. Apparatus in accordance with claim 1, including a storage condenser, means including said selector switch for selectively connecting said storage condenser to one of a plurality of resistors, and an electronic tube connected to sense the potential on said condenser to control the period of activation of said equipment.

5. Apparatus in accordance with claim 1, including timing circuits controlled by said selector switch for energizing said equipment for pre-selected intervals of time, and means operative upon expiration of the selected interval for restoring said selector switch to home position.

6. In combination, a recorder-reproducer equipment of the type having a motor control, an index control for advancing the recorder head, and a play-back control, a remote control line, a selector switch, means including a relay for responding exclusively to the A. C. component of dial pulses on said line for advancing said selector switch in accordance with the number of pulses received over said line, circuits connected to said selector switch for energizing said motor control and said index control for pre-determined intervals of time, and means energized concomitantly with one of said circuits for operating said play-back control.

7. The combination of claim 6, including means responsive to speech signals on said line for energizing said equipment in recording condition so long as said speech signals continue to be received.

8. In recorder control equipment, a control line, an electron tube controlled by said line, a marginal relay, a transformer having its primary winding connected in series with the winding of said relay and with the space path of said tube, means responsive to speech signals appearing in the secondary winding of said transformer for energizing a recorder control circuit, a selector switch, means controlled by said relay and responsive to sound pulses applied thereto from said electron tube for controlling said selector switch, and means connected to said selector switch for energizing a second recorder control circuit.

References Cited in the file of this patent

UNITED STATES PATENTS 2,200,351 Whitehead et al. -------- May 14, 1940